US011487825B1

United States Patent
Dargude et al.

(10) Patent No.: US 11,487,825 B1
(45) Date of Patent: Nov. 1, 2022

(54) SYSTEMS AND METHODS FOR PRIORITIZING AND DETECTING FILE DATASETS BASED ON METADATA

(71) Applicant: Veritas Technologies LLC, Santa Clara, CA (US)

(72) Inventors: Shailesh Dargude, Santa Clara, CA (US); Harshit Shah, Pune (IN); Anand Athavale, San Jose, CA (US); Satish Grandhi, Santa Clara, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 834 days.

(21) Appl. No.: 16/374,568

(22) Filed: Apr. 3, 2019

Related U.S. Application Data (60) Provisional application No. 62/653,541, filed on Apr. 5, 2018.

(51) Int. Cl.
| | |
|---|---|
| *G06F 16/907* | (2019.01) |
| *G06F 16/14* | (2019.01) |
| *G06N 20/00* | (2019.01) |
| *G06F 16/906* | (2019.01) |
| *G06K 9/62* | (2022.01) |
| *G06F 16/9035* | (2019.01) |

(52) U.S. Cl.
CPC .......... *G06F 16/907* (2019.01); *G06F 16/14* (2019.01); *G06F 16/906* (2019.01); *G06F 16/9035* (2019.01); *G06K 9/6256* (2013.01); *G06N 20/00* (2019.01)

(58) Field of Classification Search
CPC ....... G06F 16/906–907; G06F 16/9035; G06F 16/14; G06N 20/00; G06K 9/6256
See application file for complete search history.

(56) References Cited

U.S. PATENT DOCUMENTS

| | | | | |
|---|---|---|---|---|
| 7,496,605 | B2* | 2/2009 | Sudhi | G06F 16/10 |
| | | | | 707/999.009 |
| 9,471,243 | B2* | 10/2016 | Kumar | G06F 16/185 |
| 10,726,356 | B1* | 7/2020 | Zarandioon | G06N 7/005 |
| 2014/0089565 | A1* | 3/2014 | Lee | G06F 3/061 |
| | | | | 711/103 |

(Continued)

OTHER PUBLICATIONS

Brownlee, Jason, "A Gentle Introduction to the Bag-of-Words Model", URL: https://machinelearningmastery.com/gentle-introduction-bag-words-model/, Machine Learning Mastery, Oct. 9, 2017, 24 pages.

(Continued)

*Primary Examiner* — Robert W Beausoliel, Jr.
*Assistant Examiner* — Susan F Rayyan
(74) *Attorney, Agent, or Firm* — FisherBroyles, LLP (57) ABSTRACT

The disclosed computer-implemented method for prioritizing and detecting file datasets based on metadata may include (i) receive a group of files from a data storage, (ii) train a machine-learning model utilizing a set of properties derived from metadata associated with the files, (iii) identify, utilizing the machine-learning model, a dataset including at least one candidate file that performs an action in a set of predetermined actions, and (iv) prioritize the action based on the dataset. Various other methods, systems, and computer-readable media are also disclosed.

20 Claims, 4 Drawing Sheets

(56) References Cited

U.S. PATENT DOCUMENTS

| | | | | |
|---|---|---|---|---|
| 2015/0317339 A1* | 11/2015 | Vranyes | ............... | G06F 16/21 707/695 |
| 2018/0060759 A1* | 3/2018 | Chu | ............... | G06N 20/00 |
| 2019/0043487 A1* | 2/2019 | Rivkin | ............... | G06N 5/003 |

OTHER PUBLICATIONS

Socher et al., "CS 2240: Deep Learning for NLP", URL: https://cs224d.stanford.edu/lecture_notes/notes1.pdf, Lecture Notes: Part 1, 2016, pp. 1-10.

Kasturi et al., "Systems and Methods for Data Management of Multiple Cloud Services", U.S. Appl. No. 16/375,243, filed Apr. 4, 2019, 69 pages.

Dargude et al., "Systems and Methods for Computing a Risk Score for Stored Information", U.S. Appl. No. 16/116,490, filed Aug. 29, 2018, 52 pages.

Dargude et al., "Systems and Methods for Managing User Entitlements of Objects from Heterogeneous Content Sources", U.S. Appl. No. 16/374,409, filed Apr. 3, 2019, 59 pages.

Veritas, "Veritas Information Map Installation and Administration Guide", URL: https://www.veritas.com/content/support/en US/doc/109835244-109835565-1, Jan. 30, 2018, 81 pages.

Grandhi et al., "Systems and Methods for Generating Resource Definitions for Micro-Service-Based Platform-as-a-Service Architecture", U.S. Appl. No. 16/115,020, filed Aug. 28, 2018, 60 pages.

Dargude et al., "Systems and Methods for Normalizing Data Store Classification Information", U.S. Appl. No. 16/116,522, filed Aug. 29, 2018, 49 pages.

International Search Report and Written Opinion received for PCT Application Serial No. PCT/US2019/025801 dated Jul. 12, 2019, 10 pages.

Veritas, "Information Map Feature Briefing Veritas Information Map", URL: https://www.veritas.com/content/support/en US/doc/ka6j0000000L71WAAS, Jan. 1, 2016, 8 pages.

Veritas, "Information Map Whitepaper Security In-Depth", URL: https://www.veritas.com/content/support/en US/doc/ka6j0000000L8hfAAC, Jan. 1, 2017, 25 pages.

Veritas, "Veritas Information Map User Guide", URL: https://www.veritas.com/content/support/en US/doc/107111172-109780806-1, Nov. 21, 2017, 379 pages.

* cited by examiner

SYSTEMS AND METHODS FOR PRIORITIZING AND DETECTING FILE DATASETS BASED ON METADATA

CROSS REFERENCE TO RELATED APPLICATION

This application claims the benefit of U.S. Provisional Application No. 62/653,541, filed Apr. 5, 2018, the disclosure of which is incorporated, in its entirety, by this reference.

BACKGROUND

Many organizations store and use an exponentially increasing amount of data across a number of platforms and locations, including internally managed on-premise storage solutions, externally managed cloud-based services, or a mixture of one or more of the same. Due to the large scale of this data, gaining insights into new or old data and/or controlling a data lifecycle is becoming increasingly challenging. For example, organizations may often read the content of company files to determine whether certain conditions exist for executing one or more actions such as deletion, moving, or classifying (e.g., for sensitive data files). However, reading the content from each of a large number of files to identify these conditions is often a resource and time-consuming process.

SUMMARY

As will be described in greater detail below, the instant disclosure describes various systems and methods for prioritizing and detecting file datasets based on metadata.

In one embodiment, a method for prioritizing and detecting file datasets based on metadata may include (i) receiving, by a computing device, a group of files from a data storage, (ii) training, by the computing device, a machine-learning model utilizing a set of properties derived from metadata associated with the files, (iii) identifying, by the computing device and utilizing the machine-learning model, a dataset comprising at least one candidate file that performs an action in a set of predetermined actions, and (iv) prioritizing, by the computing device, the action based on the dataset.

In some examples, the machine-learning model may be trained by (i) scanning the metadata to identify the properties, where the properties are features to include in the training data, (ii) utilizing training data to build a classifier for each of the predetermined actions, and (iii) verifying the classifier. In some embodiments, the metadata, which may include file metadata, user metadata, and access metadata, may be one or file directory service data, file directory data, access control list data, and file access data. In some examples, the features included in the training data may be one or more of file owner attribute data, file user attribute data, file type data, file activity data, file permission data, file age data, filename classification data, and file share risk data.

In some embodiments, the dataset may be identified by predicting the dataset utilizing the machine-learning model. For example, the dataset may be predicted by that the candidate file is included in the dataset. In some examples, the predetermined actions may include a file remediation action and/or a file classification action.

In one example, a system for prioritizing and detecting file datasets based on metadata may include several modules stored in memory, including (i) a receiving module, stored in memory, that receives a group of files from a data storage, (ii) a training module, stored in the memory, that trains a machine-learning model utilizing a set of properties derived from metadata associated with the files, (iii) an identification module, stored in the memory, that utilizes the machine-learning model to identify a dataset comprising at least one candidate file that performs an action in a set of predetermined actions, (iv) a prioritization module, stored in the memory, that prioritizes the action based on the dataset, and (v) at least one physical processor that executes the receiving module, the training module, the classifier module, the identification module, and the prioritization module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive a group of files from a data storage, (ii) train a machine-learning model utilizing a set of properties derived from metadata associated with the files, (iii) identify, utilizing the machine-learning model, a dataset comprising at least one candidate file that performs an action in a set of predetermined actions, and (iv) prioritize the action based on the dataset.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for prioritizing and detecting file datasets based on metadata. As will be explained in greater detail below, by training a machine-learning model utilizing a set of properties derived from a combination of file metadata, user metadata, and access metadata associated with a group of files, the various systems and methods described herein may be able to identify datasets including candidate files for performing an action and further prioritize the action based on the dataset. By utilizing the combination of metadata in this way, the machine-learning model may be utilized to categorize and/or classify even large amounts of data into various datasets to evaluate conditions for performing various actions without wasting the valuable resources and/or time associated with traditional methods that rely on reading file content.

Figure 1:
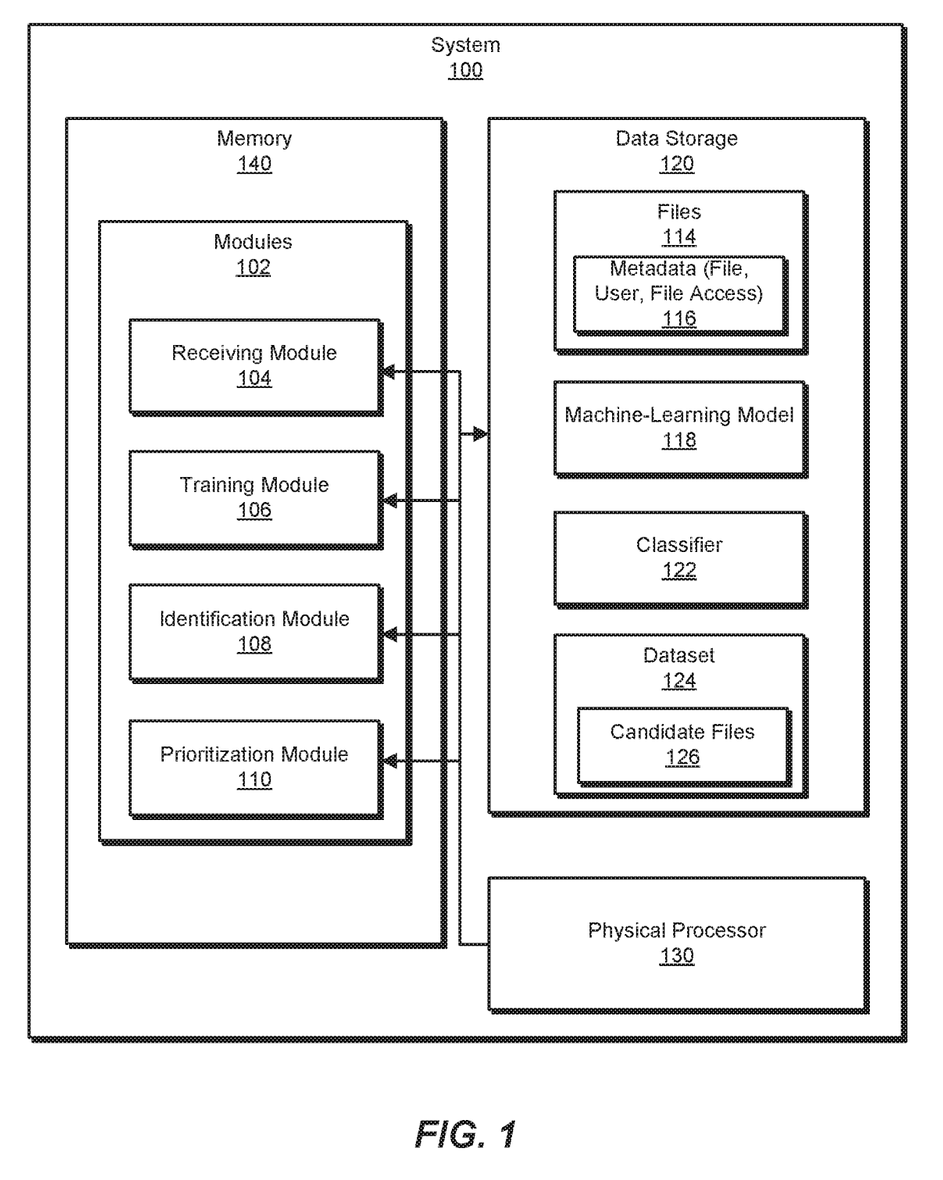
FIG. 1 is a block diagram of an example system for prioritizing and detecting file datasets based on metadata.
Figure 2:
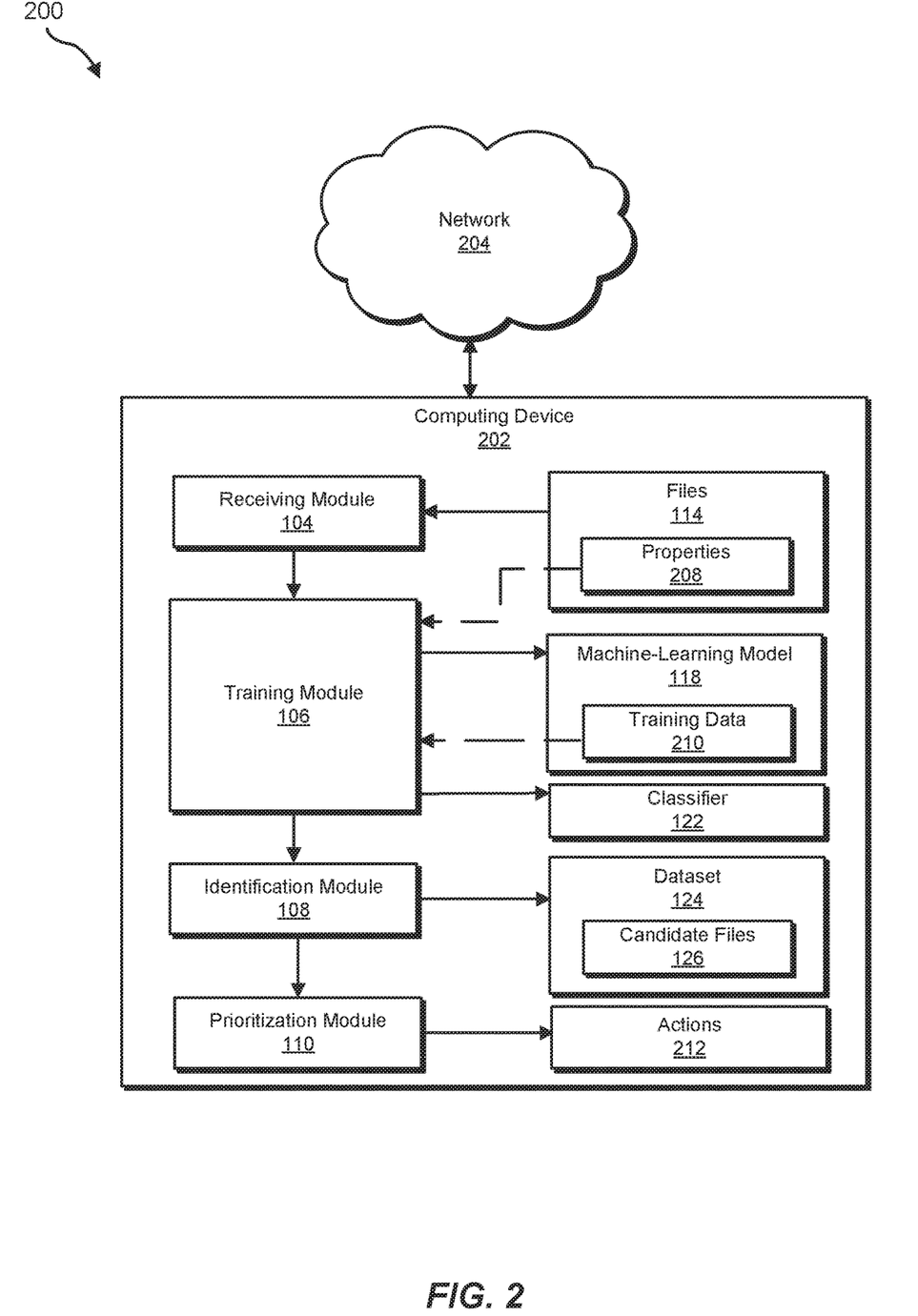
FIG. 2 is a block diagram of an additional example system for prioritizing and detecting file datasets based on metadata.

The following will provide, with reference to FIGS. 1-2, detailed descriptions of example systems for prioritizing and detecting file datasets based on metadata. Detailed descriptions of corresponding computer-implemented methods will also be provided in connection with FIG. 3. In addition, a detailed description of example file features utilized in an example system for prioritizing and detecting file datasets based on metadata, will also be provided in connection with FIG. 4.

FIG. 1 is a block diagram of an example system 100 for prioritizing and detecting file datasets based on metadata. For example, and as will be explained in greater detail below, example system 100 may include a receiving module 104 that receives a plurality of files from a data storage. Example system 100 may additionally include a training module 106 that trains a machine-learning model by utilizing a set of properties derived from file metadata. Example system 100 may also include an identification module 108 that utilizes the machine-learning model to identify a dataset comprising a candidate file that performs an action in a set of predetermined actions. Example system 100 may additionally include a prioritization module 110 that that prioritizes the action based on the dataset. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate prioritizing and detecting file datasets based on metadata. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include a data storage 120. In one example, data storage 120 may store files 114 along with associated metadata 116. Data storage 120 may also store a machine learning model 118, a classifier 122, and a dataset 124. Data set 124 may include one or more candidate files 126.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a network 204. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to prioritize and detect file datasets based on metadata.

For example, receiving module 104 may receive files 114. Then training module 106 may train machine-learning model 118 utilizing properties 208 from files 114. Next, identification module 108 may utilize machine-learning model 118 to identify dataset 124 including one or more candidate files 126 that may perform actions 212. Finally, prioritization module 110 may prioritize an action 212 based on dataset 124.

Computing device 202 generally represents any type or form of computing device capable of reading computer-executable instructions. In some examples, computing device 202 may be an endpoint client device capable of executing files for performing a variety tasks (e.g., action) for an organizational department or business unit, such as human resource functions. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

Network 204 generally represents any medium or architecture capable of facilitating communication or data transfer. In one example, network 204 may facilitate communication with computing device 202. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
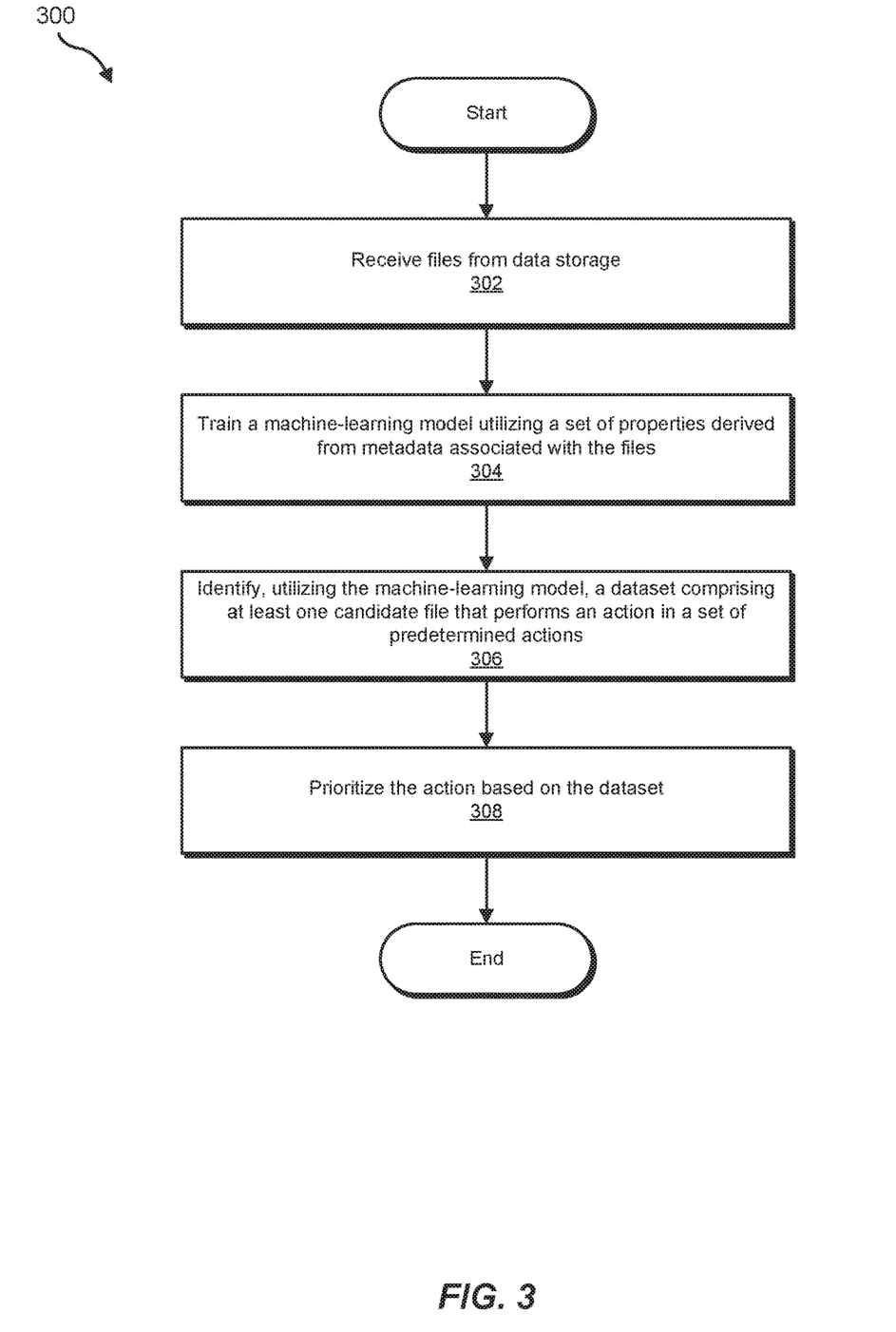
FIG. 3 is a flow diagram of an example method for prioritizing and detecting file datasets based on metadata.

FIG. 3 is a flow diagram of an example computer-implemented method 300 for prioritizing and detecting file datasets based on metadata. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive files from a data storage. For example, receiving module 104 may, as part of computing device 202 in FIG. 2, receive files 114 from data storage 120.

Receiving module 104 may receive files 114 in a variety of ways. In some examples, receiving module 104 may receive files 114 over network 204 from an organizational server configured for maintaining employee and managerial personnel records for an organization. In some embodiments, files 114 may include various metadata 116 describing various features (e.g., attributes) including identifying a department, business unit, job title, and/or any other attribute that may be used for grouping people.

At step 304, one or more of the systems described herein may train a machine-learning model utilizing a set of properties derived from metadata associated with the files. For example, training module 106 may, as part of computing device 202 in FIG. 2, train machine learning model 118 utilizing properties 208 derived from metadata 116 associated with files 114. In some examples, metadata 116 may include file metadata, user metadata, and access metadata.

Training module 106 may train machine-learning model 118 in a variety of ways. In some examples, training module 106 may scan metadata 116 to identify properties 208. In one example, properties 208 may include features to include in training data 210. Training module 106 may further utilize training data 210 to build classifier 122 for each of a number of predetermined actions 212. Training module 106 may then verify classifier 122. For example, training module 106 may, in an initial phase of model training, scan for and gather activity information for a large number of files 114 on which an action 212 was performed on the same or different content sources. Once a sufficient number of training samples has ben obtained, training module 106 may build classifier 122 on the training set. If training module 106 (upon verifying classifier 122) determines that the accuracy of classifier 122 is low, training module 106 may discard classifier 122, wait for new data, and then rebuild classifier 122 based on the new data. In some examples, actions 212 may include one or more of a file remediation action and a file classification action.

At step 306, one or more of the systems described herein may identify, utilizing the machine-learning model, a dataset comprising at least one candidate file that performs an action in a set of predetermined actions. For example, identification module 108, as part of computing device 202 in FIG. 2, may identify dataset 124 including at least one candidate file 126 that performs an action 212, utilizing machine learning model 118.

Identification module 108 may identify dataset 124 in a variety of ways. In some examples, identification module 108 may identify dataset 124 based on the various features utilized in training machine-learning model 118, such as features 400 shown in FIG. 4.

Figure 4:
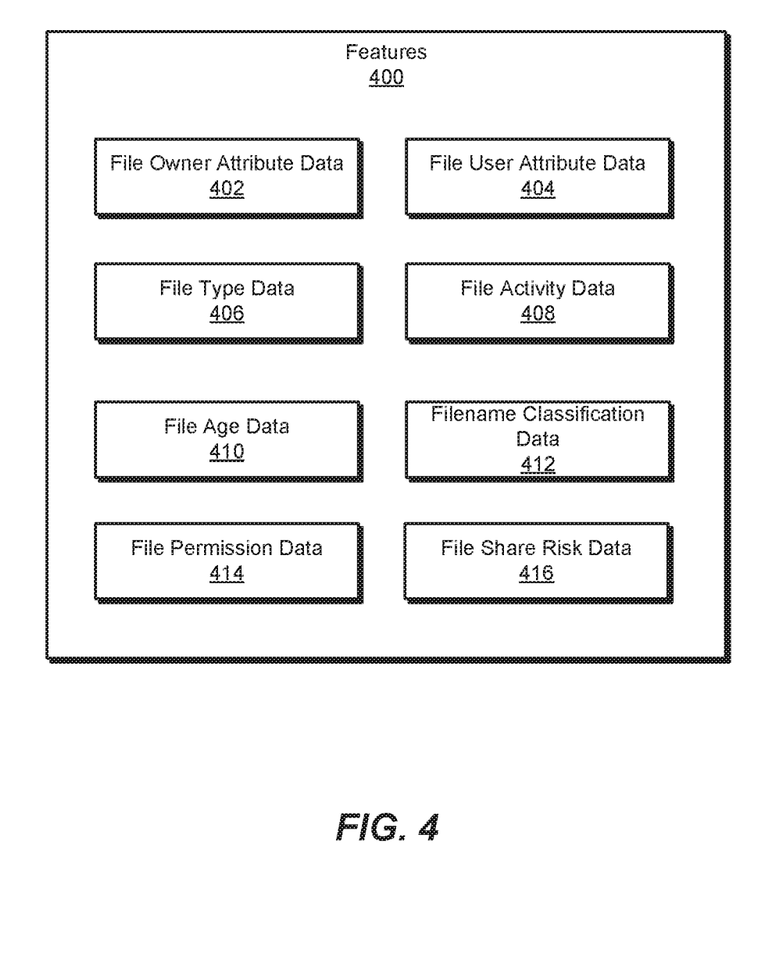
FIG. 4 is a block diagram showing file features utilized in an example system for prioritizing and detecting file datasets based on metadata.

Turning now to FIG. 4, features 400 may include file owner attribute data 402, file user attribute data 404, file type data 406, file activity data 408, file age data 410, filename classification data 412, file permission data 414, and file share risk data 416. In some examples, file owner attribute data 402 may include attributes associated with the owner of a file 114 (e.g., the owner as indicated by a filesystem or inferred by activity on a file 114). For example, file owner attribute data 402 may include, without limitation, one or more of the following attributes: Department, Business Unit, Job Title, Manager. In some examples, these attributes from directory services (e.g., Active Directory) or be supplied by a customer.

In some examples, file user attribute data 404 may include a hierarchical order of attribute values such as a tree (e.g., Software Engineer<Sr. Software Engineer or Software Engineer<Product Manager). In some embodiments, the hierarchy may be provided by a customer or inferred during a directory scan. A tree hierarchy, in some examples, may include a largest attribute distance between active users and the top of the tree, a depth of the owner, and a depth of the closest common ancestor of all users having access to a common file path.

In some examples, file type data 406 may include a type of file 114 such as an office suite document, a portable document file (pdf) document, etc. In some embodiments, file activity data 408 may include features based on file activity such as read-write percentage, whether a file 114 is collaborative (e.g., more than one user is active on a file 114), whether a parent file folder is collaborative, whether a file 114 has been accessed by risky users (e.g., when a score or ranking of users based on the amount of risk they pose is available), whether a file 114 has been accessed by a watch-listed user (e.g., a pre-configured list of users), and/or a distribution of access counts by a primary attribute (e.g., file access counts by a department in an organization.

In some examples, file age data 410 may include an age of a file 114 from the first file access. In some embodiments, filename classification data 412 may include topics derived from a filename. For example, a filename may be correlated with the nature of the content of a file (e.g., sales_figures.xls).

In some examples, file permission data 414 may be determined by utilizing access control lists (ACLs) and group membership data to derive a tree on which distances are created. For each user that has access to a given file path, the memberships through which a user gains access may be computed. Then, for each file path, the distance as the number of memberships that have to be traversed to reach the user, may be computed. In some embodiments, file permission data 414 may include a largest distance between a file owner and other active users and/or a distribution of an active user with respect to other active users. In some examples, file share risk data 416 may include an information risk score of a share to which a file 114 belongs.

Returning now to FIG. 3, at step 308, one or more of the systems described herein may prioritize an action based on the dataset. For example, prioritization module 108, as part of computing device 202 in FIG. 2, may prioritize an action 212 based on dataset 124.

Prioritization module 108 may prioritize an action 212 in a variety of ways. For example, an action 212 for remediating one or more candidate files 126 may be prioritized based on dataset 124. Additionally or alternatively, an action 212 for classifying one or more candidate files 126 may be prioritized based on dataset 124.

As explained above in connection with FIGS. 1-4, a self-learning method may utilize using properties derived from file metadata, user metadata, and file access metadata (e.g., read/writes/updates per (user, file, timestamp). The properties may be utilized to train a classification algorithm that correlates the properties to generate a self-learning model (e.g., a machine-learning model). The model may then be utilized to identify a dataset containing candidate files for performing certain actions. In some examples, this may be achieved by training a multiclassification model to predict whether a given file is a candidate for an action needing prioritization such as file remediation and classification actions. By training the model in this way, sample data may be correlated with various metadata information that may be used to predict useful facts such as detecting that a file user belongs to the human resources department for an organization based on file metadata correlating to the term "Offer" and including a file extension correlating to sensitive information (i.e., "dark data" visibility). Moreover, the model may be utilized to categorize and/or classify data in various datasets (e.g., buckets) and provide unique insights based on that data.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for prioritizing and detecting file datasets based on metadata, at least a portion of the method being performed by a computing device comprising at least one processor, the method comprising:
    receiving, by the computing device, a plurality of files from a data storage;
    training, by the computing device, a machine-learning model utilizing a set of properties derived from metadata associated with the files, wherein training the machine-learning model comprises:
        scanning the metadata to identify the properties, the properties comprising features to include in training data;
        utilizing the training data to build a classifier for each action in a set of predetermined actions; and
        verifying the classifier, wherein verifying the classifier comprises:
            determining an accuracy of the classifier for the each action;
            discarding the classifier when the classifier is inaccurate:
            receiving new training data in the machine-learning model; and
            rebuilding the classifier based on the new training data;
    identifying, by the computing device and utilizing the machine-learning model, a dataset comprising at least one candidate file that performs an action in a set of predetermined actions; and
    prioritizing, by the computing device, the action based on the dataset.

2. The computer-implemented method of claim 1, wherein scanning the metadata comprises scanning at least one of file metadata, user metadata, and access metadata.

3. The computer-implemented method of claim 2, wherein the file metadata, the user metadata, and the access metadata comprise at least one of:
    file directory service data;
    file directory data;
    access control list data; and
    file access data.

4. The computer-implemented method of claim 1, wherein the features comprise at least one of:
    file owner attribute data;
    file user attribute data;
    file type data;
    file activity data;
    file permission data;
    file age data;
    filename classification data; and
    file share risk data.

5. The computer-implemented method of claim 1, wherein identifying the dataset comprises predicting the dataset utilizing the machine-learning model.

6. The computer-implemented method of claim 5, wherein predicting the dataset comprises predicting that the candidate file is included in the dataset.

7. The computer-implemented method of claim 1, wherein the predetermined actions comprise at least one of:
    a file remediation action; and
    a file classification action.

8. A system for prioritizing and detecting file datasets based on metadata, the system comprising:
    a receiving module, stored in memory, that receives a plurality of files from a data storage;
    a training module, stored in the memory, that trains a machine-learning model utilizing a set of properties derived from metadata associated with the files, wherein training module trains the machine-learning model by:
        scanning the metadata to identify the properties, the properties comprising features to include in training data;
        utilizing the training data to build a classifier for each action in a set of predetermined actions; and
        verifying the classifier, wherein verifying the classifier comprises:
            determining an accuracy of the classifier for the each action;
            discarding the classifier when the classifier is inaccurate:
            receiving new training data in the machine-learning model; and
            rebuilding the classifier based on the new training data;
    an identification module, stored in the memory, that utilizes the machine-learning model to identify a dataset comprising at least one candidate file that performs an action in a set of predetermined actions;
    a prioritization module, stored in the memory, that prioritizes the action based on the dataset; and
    at least one physical processor that executes the receiving module, the training module, the identification module, and the prioritization module.

9. The system of claim 8, wherein the training module scans the metadata by scanning at least one of file metadata, user metadata, and access metadata.

10. The system of claim 9, wherein the file metadata, the user metadata, and the access metadata comprise at least one of:
    file directory service data;
    file directory data;
    access control list data; and
    file access data.

11. The system of claim 8, wherein the features comprise at least one of:
    file owner attribute data;
    file user attribute data;
    file type data;
    file activity data;
    file permission data;
    file age data;
    filename classification data; and
    file share risk data.

12. The system of claim 8, wherein the identification module identifies the dataset by predicting the dataset utilizing the machine-learning model.

13. The system of claim 12, wherein the identification module predicts the dataset by predicting that the candidate file is included in the dataset.

14. The system of claim 8, wherein the predetermined actions comprise at least one of:
 a file remediation action; and
 a file classification action.

15. A non-transitory computer-readable medium comprising one or more computer-executable instructions that, when executed by at least one processor of a computing device, cause the computing device to:
 receive a plurality of files from a data storage;
 train a machine-learning model utilizing a set of properties derived from metadata associated with the files, wherein the one or more computer-executable instructions cause the computing device to train the machine-learning model by:
  scanning the metadata to identify the properties, the properties comprising features to include in training data;
  utilizing the training data to build a classifier for each action in a set of predetermined actions; and
  verifying the classifier, wherein verifying the classifier comprises:
   determining an accuracy of the classifier for the each action;
   discarding the classifier when the classifier is inaccurate:
   receiving new training data in the machine-learning model; and
   rebuilding the classifier based on the new training data;
 identify, utilizing the machine-learning model, a dataset comprising at least one candidate file that performs an action in a set of predetermined actions; and
 prioritize the action based on the dataset.

16. The non-transitory computer-readable medium of claim 15, wherein the metadata comprises at least one of file metadata, user metadata, and access metadata.

17. The non-transitory computer-readable medium of claim 16, wherein the file metadata, the user metadata, and the access metadata comprise at least one of:
 file directory service data;
 file directory data;
 access control list data; and
 file access data.

18. The non-transitory computer-readable medium of claim 15, wherein the features comprise at least one of:
 file owner attribute data;
 file user attribute data;
 file type data;
 file activity data;
 file permission data;
 file age data;
 filename classification data; and
 file share risk data.

19. The non-transitory computer-readable medium of claim 15, wherein the one or more computer-executable instructions cause the computing device to identify the dataset by predicting the dataset utilizing the machine-learning model.

20. The non-transitory computer-readable medium of claim 19, wherein predicting the dataset comprises predicting that the candidate file is included in the dataset.

* * * * *